Figure 1:
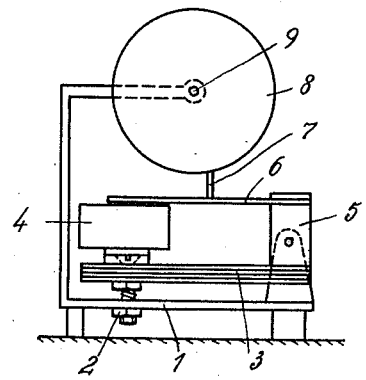

June 3, 1930.                O. MUCK                1,761,146

RESONANCE SPRING DRIVING DEVICE

Filed July 12, 1926

OTTO MUCK
INVENTOR;
By
his Attorney.

Patented June 3, 1930

1,761,146

UNITED STATES PATENT OFFICE

OTTO MUCK, OF MUNICH, GERMANY

RESONANCE SPRING DRIVING DEVICE

Application filed July 12, 1926, Serial No. 122,027, and in Germany December 31, 1924.

I have filed applications in Germany as follows:—87787/21 filed December 31, 1924, 89801/21 filed May 11, 1925, 89866/21 filed May 15, 1925, 89942/21 filed May 30, 1925, 90358/21 filed July 1, 1925, 90620/21 filed July 15, 1925, 94351/21 filed April 10, 1926 and 94372/21 filed April 22, 1926.

My invention relates to a driving device or motor, wherein an alternating current actuated electromagnet acts upon a mechanical oscillatory system tuned to a definite frequency and this oscillatory system, which begins to oscillate when the number of alternations (either the frequency or the number of alternations of the alternating current) substantially coincides with the inherent oscillatory frequency of the system, actuates a rotatably mounted member. More specifically stated, my invention relates to adjustable damping means for the mechanical oscillatory system of said driving device.

One object of my invention is to make the resonance sharpness of the said oscillatory system adjustable by regulating the damping action.

Another object of the invention is to regulate the time which transpires between the incoming of the alternating current impulse and the functioning of the driving device, such regulation being effected by more or less removing the part actuated by the oscillatory system from the rest position of the system.

It is still another object of my invention to so construct the driving device that it is capable of actuating mechanisms requiring substantial power for their actuation, such for example as hand setting devices for remotely controlled clocks, switches for central illuminating stations and the like.

The driving device of my invention comprises an alternating current electromagnet, a mechanical oscillatory system adapted to oscillate when the frequency of the alternating current is equal to the natural frequency of said system, an impact finger combined with said oscillatory system either by a positive connection or by a connection which may be power controlled, a revolubly mounted member having its periphery projecting into the path of movement of said impact finger and lying with its axis of rotation outside of the imaginary extension of said path and means adapted to adjust the distance between any two at least of the said oscillatory system, the said impact finger and the said revolubly mounted member.

In the simplest form of the invention, the revolubly mounted member actuated by the oscillatory system forms a unit with the part effecting the damping of the oscillatory system. Either the revolubly mounted part or the oscillatory system is adjustable in relation to the other.

In a modified form of the invention, the actuated member and the part which effects damping are mechanically separated from each other, the damping part being preferably arranged between the oscillatory system and the actuated member. The damping member receives the energy transmitted by the electromagnet into the oscillatory system and in turn transmits this energy to the actuated member.

Figure 2:
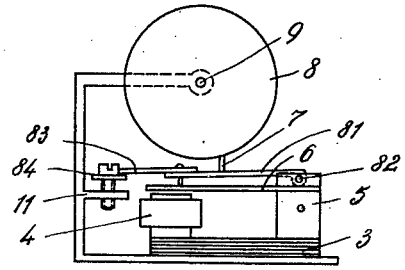
Figure 3:
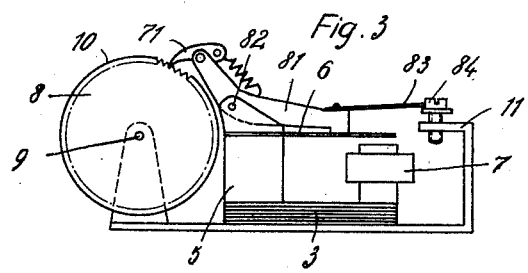

In the accompanying drawings: Figure 1 is a diagrammatic view of a simple form of the invention; Figure 2 is a side elevational view of a device embodying an auxiliary spring element interposed between the vibrating spring and the driven member and Figure 3 is a view of a further modification of the invention in which the driven member is operated upon by a pawl carried by the vibrating spring.

Mounted on the part 1 of the frame, by means of the set screw 2, is a laminated block 3, carrying at one of its ends the electromagnet 4 and at the other end the block 5 which supports the leaf spring 6. Secured to the spring 6 is an impact finger 7 and projecting into the path of movement of the finger 7 is the periphery of the disc 8 rotatable about the stud or shaft 9. If current whose number of alternations coincides with the natural frequency of the spring 6 enters the magnet 4, the spring begins to vibrate and drives the disc 8 by means of the finger 7.

If, as shown in Fig. 1, the finger 7 engages the periphery of the disc 8, the spring 6 is strongly damped; it has a very flat resonance curve and is but slightly selective. For this reason, the described apparatus will function even if the number of alternations of the alternating current deviates by several per cent from the inherent frequency of the spring 6. If, however, the screw 2 is turned so that the finger is more remote from the periphery of the disc 8, the damping becomes less, the apparatus becomes more selective and will only function if the number of alternations of the alternating current coincides more or less exactly with the natural frequency of the spring. In large scale manufacture of mechanisms of this kind it is desirable that they shall all have substantially the same degree of selectivity, but because of small unavoidable deviations, for example in the composition of the material, in the tensioning of the spring, etc., it is not generally possible in large scale production to turn out entirely uniform oscillatory systems. The present invention provides simple means to make the characteristics of the several devices uniform.

In the modified form shown in Fig. 2, the finger 7 is carried by the intermediate hammer-like member 81 which is pivotally mounted at 82 on the block 5. Under the influence of gravity or of a spring as the equivalent thereof, the member 81 tends to move towards the spring 6. The member 81 has an extension 83 resting on the stop 84 adjustable in the frame 11. By adjusting the stop the hammer 81 may be moved more or less away from the position of rest of the spring 6, and the damping may thus be regulated in the same manner as with the device of Fig. 1.

The operation of the device is as follows:—

As the alternating current impulse enters, the spring 6 begins to oscillate and as soon as its amplitude is sufficiently great that the spring impacts against the hammer 81 the latter is thrown upwardly and actuates the disc 8 by means of the finger 7.

Fig. 3 is much like Fig. 2, except that a pawl 71 is used instead of the finger 7 and the periphery of the wheel or disc 8 is provided with teeth 10 into which the end of the pawl engages. The disc 8 is actuated only when the hammer 81 is raised by the spring 6 and upon return of the hammer into the position shown in the drawing the pawl 71 rides idly over the teeth 10.

Having now described my invention and the manner in which the same operates what I claim and desire to secure by Letters Patent is:

1. A driving device, comprising an alternating current electromagnet, a mechanical oscillatory system adapted to oscillate when the number of alternations of the alternating current is equal to the natural frequency of said system, a movable part arranged in the path of oscillation of said system and seeking to move toward the position of rest of said system, an impact finger connected with said movable part, a revolubly mounted part arranged in the path of movement of said finger and an adjustable stop adapted to retain said movable part at a predetermined distance from the position of rest of the system.

2. A driving device, comprising an alternating current electromagnet, a spring adapted to vibrate when the number of oscillations of the alternating current is equal to the natural frequency of the spring, a pivotally mounted hammer extending into the path of vibration of the spring and seeking to move toward the position of rest of the spring, an impact finger carried by said hammer, a rotatable disc having its periphery in the path of movement of said finger and an adjustable stop adapted to retain said hammer a predetermined distance from the position of rest of the spring.

3. A driving device, comprising an alternating current electromagnet, a mechanical oscillatory system adapted to oscillate when the frequency of the alternating current is at least substantially equal to the natural frequency of said system, an impact finger connected with said oscillatory system, a revolubly mounted member having its periphery projecting into the path of movement of the said impact finger and lying with its axis outside of an imaginary extension of said path, and means adapted to adjust the distance between any two at least of the said oscillatory system, the said impact finger and the said revolubly mounted member.

In testimony whereof I hereunto affix my signature.

OTTO MUCK.